United States Patent [19]

Jensen et al.

[11] Patent Number: 4,946,878
[45] Date of Patent: Aug. 7, 1990

[54] RAPIDLY CURABLE EXTRUDABLE ORGANOSILOXANE COMPOSITIONS

[75] Inventors: Jary D. Jensen; Carl J. Bilgrien, both of Midland, Mich.

[73] Assignee: Dow Corning Corporation, Midland, Mich.

[21] Appl. No.: 471,322

[22] Filed: Jan. 29, 1990

[51] Int. Cl.$^5$ ................................................ C08K 9/06
[52] U.S. Cl. ...................... 523/213; 528/32; 528/31; 528/15; 524/862; 524/861; 523/216
[58] Field of Search ............... 528/15, 31, 32; 524/861, 862; 523/213, 216

[56] References Cited

U.S. PATENT DOCUMENTS

| | | | |
|---|---|---|---|
| 3,671,480 | 6/1972 | Wada et al. | 260/29.1 SB |
| 4,162,243 | 7/1979 | Lee et al. | 524/847 |
| 4,609,574 | 9/1986 | Keryk et al. | 426/407.1 |
| 4,611,042 | 9/1986 | Rivers-Farrell et al. | 528/32 |
| 4,753,978 | 6/1988 | Jensen | 528/15 |

FOREIGN PATENT DOCUMENTS 1269007  3/1972  United Kingdom .

*Primary Examiner*—Melvyn I. Marquis
*Assistant Examiner*—Karen A. Hellender
*Attorney, Agent, or Firm*—Robert Spector

[57] ABSTRACT

Extrudable organosiloxane compositions that cure by a hydrosilation reaction comprise a first polydiorganosiloxane containing alkenyl radicals only at the terminal positions of each molecule and a second polydiorganosiloxane containing alkenyl radicals on both terminal and non-terminal silicon atoms. When the alkenyl radicals on at least the second of the two polydiorganosiloxanes contain at least four carbon atoms the cure rate of the compositions is substantially increased relative to compositions wherein the alkenyl radicals on this polymer are vinyl.

7 Claims, No Drawings

RAPIDLY CURABLE EXTRUDABLE ORGANOSILOXANE COMPOSITIONS

BACKGROUND OF THE INVENTION

1. Field of the Invention

This invention relates to extrudable organosiloxane compositions. More particularly, this invention relates to a unique class of extrudable organosiloxane compositions that cure by the platinum-catalyzed reaction of alkenyl radicals with silicon-bonded hydrogen atoms to form elastomeric materials. The cure rate of the present compositions is considerably faster than prior art compositions wherein the ethylenically unsaturated radicals are vinyl.

2. Description of the Prior Art

Curable organosiloxane compositions containing at least one polydiorganosiloxane with at least two silicon-bonded alkenyl radicals, an organohydrogensiloxane or organic peroxide curing agent and a silica filler are well known in the art pertaining to silicone elastomers. It is also known to improve the physical properties, particularly tensile and tear strengths, of cured elastomers prepared from these curable compositions by using two or more vinyl-containing polydiorganosiloxanes of different molecular weights or a single vinyl-containing polydiorganosiloxane having a bimodal molecular weight distribution.

British patent no. 1,269,007 that issued to Wada and Ito on Mar. 29, 1972 teaches peroxide curable compositions containing two diorganosiloxanes polymers (1 and 2) each of which has at least 3000 diorganosiloxane units per molecule and a third polydiorganosiloxane containing from 10 to 1000 siloxane units per molecule. Three different vinyl-containing diorganosiloxane polymers are used to achieve high tear strength in the cured elastomer. Polymer 1 contains either no vinyl radicals or from 0.02 to 0.3 mole percent of vinyl radicals at either terminal or non-terminal positions in the molecule; polymer 2 contains from 5 to 20 mole percent of vinyl-containing siloxane units; and polymer 3 contains from 5 to 90 percent of vinyl-containing siloxane units. The tensile strength of the cured elastomers are about 9800 kPa and the maximum tear strength value reported is 45 kilonewtons per meter (kN/m). The curable compositions would have the consistency of a gum.

U.S. Pat. No. 3,671,480, which issued on June 20, 1972 to the same inventors named on the aforementioned British patent, teaches organosiloxane compositions that cure by a platinum-catalyzed hydrosilation reaction to yield elastomers exhibiting high values of tear strength. These compositions contain two different vinyl-substituted polydiorganosiloxanes. The first of these polymers contains from 0.02 to 0.2 mole percent of vinyl-substituted siloxane units and an average of at least 3000 siloxane units per molecule, which is equivalent to a gum-type polydimethylsiloxane having a viscosity of at least 1000 Pa.s. The vinyl radicals of this polymer can be located on either terminal or non-terminal repeating units. In all of the exemplified compositions the aforementioned first polymer contains non-terminal vinyl radicals. The second polymer contains an average of at least 100 siloxane units per molecule and at least 2 mole percent of vinyl-substituted siloxane units.

U.S. Pat. No. 4,162,243, which issued to Lee et al. on July 24, 1979, discloses organosiloxane compositions that cure by a platinum-catalyzed hydrosilation reaction. The molecular weight distribution of the vinyl-containing polydiorganosiloxane described by Lee et al. yield cured 9elastomers exhibiting higher durometer hardness values using less silica filler, with a resultant decrease in the viscosity of the curable composition. This is achieved by the presence in the curable composition of Lee et al. of (1) a silica filler with vinyl-containing organosiloxane groups bonded to its surface and (2) a triorganosiloxy-terminated polydimethylsiloxane composition wherein the triorganosiloxy terminal groups are defined as dimethylvinylsiloxy or phenylmethylvinylsiloxy and the composition exhibits a specified molecular weight distribution and dispersity index. The required molecular weight distribution can be achieved using a single polydimethylsiloxane or a mixture of two or more polydimethylsiloxanes.

The triorganosiloxy terminated polydimethylsiloxanes present in the compositions of the aforementioned Lee et al. patent by definition exclude the presence of ethylenically unsaturated hydrocarbon radicals in any non-terminal repeating unit.

U.S. Pat. No. 4,753,978, which issued on June 28, 1988 to Jary Jensen, one of the present applicants, teaches using two vinyl-containing polymers of different molecular weights and vinyl content in a liquid curable organosiloxane composition to prepare elastomers exhibiting a unique combination of high tensile and tear strengths without adversely affecting other desireable properties of the elastomer. This is achieved by using a high molecular weight vinyl-containing polydiorganosiloxane having vinyl radicals only at the terminal positions and a second, lower molecular weight polydiorganosiloxane wherein from 1 to 5 percent of the non-terminal silicon atoms contain a vinyl radical.

The use of higher alkenyl radicals to increase the cure rate of organosiloxane compositions curable by a platinum-catalyzed hydrosilation reaction is taught in the prior art. U.S. Pat. No. 4.609.574, which issued to Keryk et al. on Sept. 2, 1986 discloses silicone release coatings wherein at least 50 percent, preferably 100 percent of the alkenyl radicals that react with silicon-bonded hydrogen atoms during the curing reaction contain 6 or more carbon atoms and terminal unsaturation. The advantage of using the higher molecular weight alkenyl radicals relative to lower molecular weight radicals such as vinyl is a faster and more complete reaction during curing of the composition.

A preference for higher alkenyl radicals in organosiloxane compositions that cure by a radiation-initiated reaction between alkenyl radicals and mercapto groups is disclosed in U.S. Pat. No. 4,596,720, that issued to Keryk and Lo on June 24, 1986.

U.S. Pat. No. 4,611,042, which issued to S. Rivers-Farrell et al. on Sept. 9, 1986 teaches resinous copolymeric siloxanes consisting essentially of trimethylsiloxy, alkenyldimethylsiloxy and $SiO_2$ units, where the alkenyl radicals are terminally unsaturated and contain at least six carbon atoms. The presence of these alkenyl radicals in place of vinyl radicals is considered responsible for the faster cure rate of the compositions.

The present inventors investigated the effect on cure rate of substituting 5-hexenyl for vinyl radicals on the two types of vinyl-containing polydiorganosiloxanes present in curable compositions of the type described in the aforementioned U.S. Pat. No. 4,753,978. They discovered that the type of ethylenically unsaturated radical present on the polydiorganosiloxane containing non-terminal unsaturated radicals had a considerably greater effect on cure rate than the type of ethylenically unsaturated radical present on the polydiorganosiloxane containing these radicals only at the terminal positions, even when the concentration of alkenyl radicals contributed by each of the two types of polydiorganosiloxanes was equal.

SUMMARY OF THE INVENTION

An objective of this invention is to apply the higher cure rate imparted to organosiloxane release coatings by the presence of higher molecular weight alkenyl radicals to liquid organosiloxane compositions of the type described in the aforementioned Jensen patent. It has now been found that this objective can be achieved if the alkenyl radicals present in at least the polydiorganosiloxane with non-terminal alkenyl radicals (referred to hereinafter as polydiorganosiloxane B) contain a minimum of four carbon atoms. When the presence of alkenyl radicals containing 4 or more carbon atoms is limited to the polymer containing only terminal alkenyl radicals (referred to hereinafter as polydiorganosiloxane A) only a relatively small increase in cure rate is observed.

It is preferred that at least a portion of the organosilicon compound used to treat the reinforcing silica filler contain silicon-bonded alkenyl radicals, and that these alkenyl radicals are vinyl when the alkenyl radicals present in polydiorganosiloxane A contain at least four carbon atoms.

A preferred class of the present compositions is "extrudable" as defined in the aforementioned Lee et al. patent. Specifically, the compositions can be extruded at a rate of at least 45 grams per minute through a 3.175 millimeter-diameter orifice under a pressure of 620 kilopascals (kPa) at 25 degrees C. These compositions are cured using a platinum-catalyzed hydrosilation reaction.

DETAILED DESCRIPTION OF THE INVENTION

This invention provides an improved curable organosiloxane composition comprising the product obtained by mixing to homogeneity A. from 70 to 95 weight percent, based on the total weight of (A) and (B), of a first liquid diorganoalkenylsiloxy terminated polydiorganosiloxane exhibiting a viscosity of at least 12 Pa.s at 25 degrees C. and containing substantially no ethylenically unsaturated hydrocarbon radicals bonded to non-terminal silicon atoms, B. from 5 to 30 weight percent, based on the total weight of (A) and (B), of a second liquid diorganoalkenylsiloxy-terminated polydiorganosiloxane which is miscible with said first polydiorganosiloxane and exhibits a viscosity of at least 0.1 Pa.s at 25 degrees C., where from 1 to 5 mol percent of the non-terminal repeating units of said second polydiorganosiloxane contain an alkenyl radical, C. an amount sufficient to cure said composition of an organohydrogensiloxane that is miscible with the other liquid ingredients of said composition and contains an average of more than two silicon bonded hydrogen atoms per molecule, D. a platinum-containing hydrosilation catalyst in an amount sufficient to promote curing of said composition at a temperature of from ambient to 250 degrees C., and E. an amount of a treated reinforcing silica filler sufficient to improve the physical properties of a cured elastomer prepared from said composition, where the filler treating agent is comprised at least in part of an organosilicon compound containing an average of at least one alkenyl radical per molecule.

The improvement comprises the presence as the alkenyl radical in said second liquid polydiorganosiloxane (B) of a radical that is terminally unsaturated and contains at least four carbon atoms.

The inventive features considered responsible for the increased cure rate of the present curable composition are (1) the presence in the composition of two miscible liquid diorganoalkenylsiloxy-terminated polydiorganosiloxanes, the first of which, referred to as polydiorganosiloxane A, contains substantially no non-terminal alkenyl radicals and is present at a higher concentration than the second of the two diorganoalkenylsiloxy-terminated polydiorganosiloxanes, referred to as polydiorganosiloxane B, and (2) the presence on the terminal units and from 1 to 5 mol percent of the non-terminal repeating units in polydiorganosiloxane B of terminally unsaturated alkenyl radicals containing at least four, preferably at least six, carbon atoms.

Experimental data contained in the accompanying examples indicate only a relatively small increase in cure rate when terminally unsaturated alkenyl radicals containing six carbon atoms are present only in polydiorganosiloxane A and the filler treating agent, even when the total number of alkenyl radicals contributed by polydiorganosiloxanes A and B are substantially equal.

1. The Diorganoalkenylsiloxy-Terminated Polydiorganosiloxanes

(Polydiorganosiloxane A)

The term "substantial absence of non-terminal ethylenically unsaturated radicals" used to describe polydiorganosiloxane A means that a maximum of 0.2 mol percent of the hydrocarbon radicals bonded to non-terminal silicon atoms of this ingredient can contain ethylenic unsaturation.

Polydiorganosiloxane A can be represented by the average general formula $$R^1R^2{}_2SiO(R^2{}_2SiO)_xSiR^2{}_2R^1$$

where $R^1$ represents a terminally unsaturated alkenyl radical, containing at least two carbon atoms, the two $R^2$ radicals bonded to each silicon atom are individually selected from monovalent hydrocarbon radicals or substituted monovalent hydrocarbon radicals and are substantially free of ethylenic unsaturation, and x represents a degree of polymerization equivalent to a viscosity of at least 12 Pa.s at 25 degrees C. The viscosity of polydiorganosiloxane A can be up to 200 Pa.s. In preferred embodiment the viscosity of this ingredient is from 40 to 70 Pa.s.

The alkenyl radical represented by $R^1$ contains at least two carbon atoms and can be represented by the formula —RCH=CH$_2$, where R represents a single bond or an alkylene radical containing from 2 to 10 or more carbon atoms. The alkylene radical can be linear or branched. Examples of suitable alkenyl radicals represented by $R^1$ include but are not limited to vinyl, 2-propenyl, 3-butenyl, 5-hexenyl, 7-octenyl and 10-undecenyl. $R^1$ is most preferably vinyl or 5-hexenyl.

The $R^2$ radicals bonded to the silicon atoms of ingredient A contain from 1 to 20 carbon atoms and can be identical or different. Because ingredient A is a liquid at 25 degrees C., at least one of the $R^2$ radicals on each of the silicon atoms of this ingredient is lower alkyl, most preferably methyl. The remaining $R^2$ radical on each silicon atom can be alkyl such as methyl or ethyl; substituted alkyl such as chloromethyl, 3-chloropropyl or 3,3,3-trifluoropropyl; cycloalkyl such as cyclohexyl; or aryl such as phenyl. Most preferably any $R^2$ radicals other than methyl are phenyl or 3,3,3-trifluoropropyl, this preference being based on the availability of the intermediates used to prepare these polydiorganosiloxanes and the properties of cured elastomers prepared by curing compositions containing these polymers.

Preferred embodiments of ingredient A include but are not limited to dimethylalkenylsiloxy-terminated polydimethylsiloxanes, dimethylalkenylsiloxy-terminated poly(methyl-3,3,3-trifluoropropyl)siloxanes, dimethylalkenylsiloxy-terminated dimethylsiloxane/3,3,3-trifluoropropylmethylsiloxane copolymers and dimethylalkenylsiloxy-terminated dimethylsiloxane/methylphenylsiloxane copolymers.

Methods for preparing the liquid polydiorganosiloxanes used as ingredients A and B of the present compositions by hydrolysis and condensation of the corresponding halosilanes or cyclic polydiorganosiloxanes are sufficiently disclosed in the patent and other literature that a detailed description in this specification is not necessary.

The second of the two alkenyl-substituted polydiorganosiloxanes, referred to as polydiorganosiloxane B, is a liquid diorganoalkenylsiloxy-terminated polydiorganosiloxane that can be represented by the average general formula

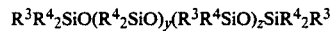

In this formula $R^3$ represents a terminally unsaturated alkenyl radical containing at least four, preferably at least six, carbon atoms and $R^4$ is selected from the same group of monovalent hydrocarbon radicals and substituted monovalent substituted hydrocarbon radicals as $R^2$. The preference for the lower limit of six carbon atoms for $R^3$ is based on the availability of the starting material, typically the corresponding chlorosilane, for preparing polyorganosiloxanes containing this radical bonded to a portion of the silicon atoms.

$R^3$ can be represented by the general formula —R"CH=CH$_2$, where R" represents an alkylene radical containing at least 2 and preferably at least 4 carbon atoms. The radical represented by R" can be linear or branched. Examples of $R^3$ include but are not limited to 5-hexenyl, 7-octenyl, 9-decenyl and 10-undecenyl.

The upper limit of ten carbon atoms for $R^1$ and $R^3$ is based on the availability of the starting materials, typically the corresponding chlorosilanes, used to prepare the polydiorganosiloxanes containing these radicals. Most preferably $R^1$ is vinyl or 5-hexenyl and $R^3$ is 5-hexenyl.

To obtain a uniform cured elastomer it is preferable that ingredients A and B be miscible with one another. To ensure miscibility it is preferable that at least 50 percent of the silicon bonded hydrocarbon radicals represented by $R^2$ and $R^4$ in the preceding formulae are members of the same class, i.e. lower alkyl radicals containing from 1 to about 4 carbon atoms. These hydrocarbon radicals are preferably identical, and are most preferably methyl.

The degree of polymerization represented by the sum of y and z is equivalent to a viscosity of at least 0.1 Pa.s, preferably from 0.1 to 10 Pa.s, and the ratio $z/(y+z)$ is from 0.01 to 0.05, which specifies the requirement for this ingredient that from 1 to 5 mole percent of the non-terminal silicon atoms contain a higher alkenyl radical having at least 6 carbon atoms. The degree of polymerization of polydiorganosiloxane B should be lower than the degree of polymerization of polydiorganosiloxane A.

Preferred embodiments of polydiorganosiloxane B include but are not limited to diorganoalkenylsiloxy-terminated dimethylsiloxane/methylalkenylsiloxane copolymers, dimethylsiloxane/methylalkenylsiloxane/3,3,3-trifluoropropylsiloxane terpolymers, and dimethylsiloxane/methylalkenylsiloxane/diphenylsiloxane terpolymers where the alkenyl radical is preferably 5-hexenyl.

To achieve high tear strength without adversely affecting other physical properties of the cured elastomer polydiorganosiloxane B constitutes from 5 to 30 percent of the combined weight of polydiorganosiloxanes A and B. Compositions containing more than about 30 percent by weight of polydiorganosiloxane B yield elastomers with too high a degree of crosslinking, resulting in reduced values of elongation, tear strength and tensile strength. Less than about 5 percent by weight of polydiorganosiloxane B will not provide the desirably high level of tear strength.

2. The Organohydrogensiloxane Curing Agent

The organosiloxane compositions of this invention are cured by a platinum catalyzed hydrosilation reaction. The curing agent is an organohydrogensiloxane containing an average of more than two silicon bonded hydrogen atoms per molecule. The organohydrogensiloxane contains from as few as four silicon atoms per molecule up to an average of 20 or more, and can have a viscosity of up to 10 Pa.s or higher at 25 C. The repeating units of this ingredient include but are not limited to $HSiO_{1.5}$, $R_5HSiO$ and/or $R^5_2HSiO_{0.5}$ in addition to one or more of monoorganosiloxy, diorganosiloxane, triorganosiloxy and $SiO_{4/2}$ units. In these formulae $R^5$ represents a monovalent hydrocarbon or halocarbon radical as defined hereinabove for the $R^2$ radical of ingredient A.

The organohydrogensiloxane can be a cyclic compound containing diorganosiloxane and organohydrogensiloxane units or a compound of the formula $Si(OSiR^5_2H)_4$.

For those embodiments of the present composition wherein at least 50 percent of those hydrocarbon radicals in ingredients A and B represented by $R^2$ and $R^4$ are methyl, $R^5$ is preferably methyl and the curing agent can be a linear or non-linear organohydrogensiloxane containing at least two methylhydrogensiloxane or dimethylhydrogensiloxy units per molecule. One class of preferred curing agents include trimethylsiloxy-terminated dimethylsiloxane/methylhydrogensiloxane copolymers containing an average of from 10 to about 50 repeating units per molecule, of which from 3 to 5 are methylhydrogensiloxane.

Alternatively, when about 50 percent of the radicals represented by $R^2$ and $R^4$ are halogenated hydrocarbon such as 3,3,3-trifluoropropyl, a similar percentage of radicals represented by $R^5$ can be the same halogenated hydrocarbon radical.

The molar ratio of silicon bonded hydrogen atoms to vinyl or other alkenyl hydrocarbon radicals in compositions curable by a hydrosilation reaction is critical with respect to the properties of the cured product. The optimum ratio for the present curable compositions will be determined at least in part by the molecular weights of ingredients A and B, the type of curing agent and the concentration of any resinous organosiloxane copolymer described hereinafter. This optimum value can readily be determined by those skilled in the art with a minimum of experimentation, and is not part of this invention.

For preferred compositions of this invention the molar ratio of silicon bonded hydrogen atoms to alkenyl radicals is between 1 and 2.

3. The Platinum Hydrosilation Catalyst and Optional Inhibitor

Hydrosilation reactions are typically conducted in the presence of a catalyst that is a platinum group metal or a compound of such a metal. Platinum compounds such as hexachloroplatinic acid, and particularly complexes of these compounds with relatively low molecular weight vinyl-containing organosiloxane compounds are preferred catalysts because of their high activity and compatibility with the organosiloxane reactants. These complexes are described in U.S. Pat. No. 3,419,593 that issued to David N. Willing on Dec. 31, 1968. Complexes with low molecular weight organosiloxanes wherein the silicon bonded hydrocarbon radicals are vinyl and either methyl or 3,3,3-trifluoropropyl are particularly preferred because of their ability to catalyze a rapid curing of the elastomer at temperatures of a least about 70 degrees C.

The platinum-containing catalyst can be present in an amount equivalent to as little as one part by weight of platinum per one million parts of curable composition. Catalyst concentrations equivalent to from 5 to 50 parts of platinum per million of curable composition are preferred to achieve a practical curing rate. Higher concentrations of platinum provide only marginal improvements in curing rate, and are therefore economically unattractive, particularly when the preferred catalysts are used.

Mixtures of the aforementioned vinyl-containing reactants, curing agents and platinum-containing catalysts may begin to cure at ambient temperature. To obtain a longer working time or "pot life", the activity of the catalyst under ambient conditions can be retarded or suppressed by addition of a suitable inhibitor.

Known platinum catalyst inhibitors include the acetylenic compounds disclosed in U.S. Pat. No. 3,445,420, which issued on May 20, 1969 to Kookootsedes et al. Acetylenic alcohols such as 2-methyl-3-butyn-2-ol constitute a preferred class of inhibitors that will suppress the activity of a platinum-containing catalyst at 25° C. Compositions containing these catalysts typically require heating at temperatures of 7° C. or above to cure at a practical rate.

If it desired to increase the pot life of a curable composition under ambient conditions, this can be accomplished using an olefinically substituted siloxane of the type described in U.S. Pat. No. 3,989,667, which issued on Nov. 2, 1976 to Lee and Marko. Cyclic methylvinylsiloxanes are preferred.

Inhibitor concentrations as low as one mole of inhibitor per mole of platinum will in some instances impart satisfactory storage stability and cure rate. In other instances inhibitor concentrations of up to 500 or more moles of inhibitor per mole of platinum are required. The optimum concentration for a given inhibitor in a given composition can readily be determined by routine experimentation and does not constitute part of this invention.

4. The Silica Filler

To achieve the high levels of tear strength and other physical properties that characterize cured elastomers prepared using the compositions of this invention, the compositions must contain a reinforcing silica filler.

Any finely divided form of silica can be used as the reinforcing filler. Colloidal silicas are preferred because of their relatively high surface area, which is typically at least 50 square meters per gram. Fillers having surface areas of at least 250 square meters per gram are preferred for use in the present method. Colloidal silicas can be prepared by precipitation or a fume process. Both of these preferred types of silica are commercially available.

The amount of finely divided silica used in the present compositions is at least in part determined by the physical properties desired in the cured elastomer. Liquid or pumpable polyorganosiloxane compositions typically contain from about 10 to about 60 percent by weight of silica, based on the weight of polydiorganosiloxane. This value is preferably from about 30 to about 50 percent.

The reinforcing filler is treated with a silica treating agents to prevent a phenomenon referred to as "creping" or "crepe hardening" during processing of the curable composition.

At least a portion of the silica treating agent suitable for use in the present compositions contain at least one silicon-bonded alkenyl radical per molecule. These silica treating agents are typically liquid hydroxyl terminated polydiorganosiloxanes containing an average of from 2 to about 20 repeating units and at least one alkenyl radical per molecule, and organosilicon compounds such as hexaorganodisiloxanes and hexaorganodisilazanes that contain at least one alkenyl radical per molecule and hydrolyze under the conditions used to treat the silica to form compounds with silicon-bonded hydroxyl groups.

Preferably at least a portion of the silicon bonded hydrocarbon radicals other than alkenyl that are present on the silica treating agent are identical to a majority of the hydrocarbon radicals present in polydiorganosiloxanes A and B. The alkenyl radicals on the silica treating agent are preferably vinyl, particularly when alkenyl radicals containing at least four carbon atoms are present on polydiorganosiloxane A.

It is believed that silica treating agents function by reacting with silicon-bonded hydroxyl groups present on the surface of the silica particles to reduce interaction between these particles and the polydiorganosiloxanes.

5. Optional Ingredients

In addition to polydiorganosiloxanes A and B, the curing agent, catalyst and silica filler the organosiloxane compositions of this invention can contain one or more additives that are conventionally present in curable compositions of this type. These materials are added to impart or enhance certain properties of the cured elastomer or facilitate processing of the curable composition. A small amount of water can be added together with the silica treating agent(s) as a processing aid.

Typical additives include but are not limited to pigments, dyes, adhesion promoters, flame retardants, heat and/or ultraviolet light stabilizers and up to about 30 weight percent, based on the combined weight of polydiorganosiloxanes A and B. of resinous organosiloxane copolymers to enhance the physical properties of the cured elastomer.

A preferred type of resinous copolymer contains repeating units of the general formula $SiO_{4/2}$ in addition to triorganosiloxy units of the general formulae $R'_3SiO_{1/2}$ and diorganoalkenylsiloxy units of the general formula $R''(R''')_2SiO_{1/2}$. In these formulae R' and R'' are individually monovalent hydrocarbon or substituted monovalent hydrocarbon radicals as previously defined for the $R^1$ and $R^2$ radicals of the polydiorganosiloxanes A and B, and R''' represents an terminally unsaturated alkenyl radical containing from 2 to about 10 carbon atoms.

The molar ratio of the combination of triorganosiloxy units and diorganoalkenylsiloxy units to $SiO_{4/2}$ units in the resinous copolymer is from 0.7 to 1.2, inclusive. The alkenyl-containing units constitute from 2 to 8 percent by weight of the copolymer, which preferably contains at least two alkenyl radicals per molecule. In preferred embodiments of the copolymer the ranges for the molar ratio of diorganoalkenylsiloxy: triorganosiloxy:$SiO_{4/2}$ units is 0.08-0.1:0.06-1:1.

The resinous copolymers can be prepared as described in U.S. Pat. No. 2,676,182, which issued to Daudt and Tyler on Apr. 20, 1954 and is hereby incorporated in this specification by reference thereto. The copolymers described in this patent contain from 2 to 23 percent by weight of hydroxyl groups, which is considerably above the maximum level of about 0.8 weight percent preferred for precursors of the present copolymers. The hydroxyl content of the precursor can be conveniently reduced to the desired level by employing a higher concentration of triorganosiloxy capping agent than the concentration range taught by Daudt et al.

Briefly, the method of Daudt et al. comprises reacting a silica hydrosol under acidic conditions with the appropriate amount of hexamethyldisiloxane or trimethylchlorosilane. The resinous copolymer used to prepare the present elastomers can be obtained by reacting Daudt et al's. product with the required amount of a hexaorganodisilazane or a hexaorganodisiloxane wherein each silicon atom contains an alkenyl radical and two methyl or other hydrocarbon radicals represented by R' and R'' in the foregoing formula.

6. Preparation of Curable Compositions

The silica filler can be treated in the presence of at least a portion of the other ingredients of the present compositions by blending these ingredients together until the filler is completely treated and uniformly dispersed throughout the composition to form a homogeneous material. The ingredients that are present during treatment of the silica typically include the silica treating agents and at least a portion of the polydiorganosiloxanes referred to herein as ingredients A and B. The organohydrogensiloxane and platinum-containing catalyst are typically added after treatment of the silica has been completed.

Irrespective of the type of mixer used, blending of the silica, filler treating agent(s) and ingredients A and B is continued while the composition is heated at temperatures from about 100 to 250 degrees C. under reduced pressure to remove volatile materials. The resultant product is then cooled prior to being blended with the organohydrogensiloxane (Ingredient C) and/or the platinum catalyst (Ingredient D). depending upon whether it is desired to prepare a one-part or two-part curable composition of this invention. The optional additives referred to hereinbefore can be added at this time or during blending of the silica with ingredients A and B.

In-situ treatment of the silica can require anywhere from 15 minutes to 2 hours, depending upon the amount of material being processed, the viscosity of the material and the shear rate to which the material is subjected during processing.

Alternatively, treatment of the silica can occur before the silica is blended with other ingredients of the present compositions. Methods for treating finely divided silica fillers prior to incorporating the silica into a polyorganosiloxane composition are known in the art.

To ensure adequate blending of all ingredients the mixing equipment in which the present compositions are prepared should be capable of subjecting the composition to a high rate of shear. The advantage of using this type of a "high intensity" mixer to prepare silica filled polyorganosiloxane compositions is taught in U.S. Pat. No. 3,690,804, which issued to Minuto on June 1, 1976. In accordance with the disclosure of this patent, the tip of the stirring device in the mixer is rotated at a speed of from 25 to about 250 feet per second, which would generate considerable shearing forces. The exemplified compositions are blended in a Henschel high intensity mixer wherein the rotor was operated at a speed of 3800 revolutions per minute, equivalent to a rotor tip speed of 157 feet per second.

Dough type mixers equipped with "sigma" shape blades, are not as efficient as mixers wherein the mixing surfaces are of a relatively flat "paddle" configuration. Examples of the paddle type mixers include the Henschel mixer disclosed in the aforementioned Minuto patent and certain mixers manufactured by Neulinger A. G. The blade is preferably rotated at a speed of at least 100 revolutions per minute.

Curable compositions prepared using the present method typically exhibit viscosities of about 0.5 up to about 3000 Pa.s at 25 degrees C. To facilitate blending and transfer of the compositions and minimize entrapment of air during mixing a viscosity of less than about 20 Pa.s at 25 degrees C. is preferred, particularly for extrudable compositions.

Even in the presence of a catalyst inhibitor the present compositions will begin to cure slowly at ambient temperature when at least one of polydiorganosiloxanes A and B are combined with the organohydrogensiloxane and the platinum-containing catalyst. To achieve long-term storage stability it is desirable to package the curable composition in at least two containers for the purpose of separating the organohydrogensiloxane and the platinum-containing catalyst.

Typically the present compositions are packaged in two containers, both of which contain polydiorganosiloxanes A and B and the treated silica filler. In addition, the material in one of the containers includes the organohydrogensiloxane and the material in the second container includes the hydrosilation catalyst. To facilitate measuring and processing the curable composition is prepared by blending equal volumes of material from the two containers.

7. Fabrication and Curing of Shaped Articles

The present curable compositions can be formed into shaped articles by press molding, injection molding, extrusion, or any of the other methods used to fabricate organosiloxane compositions.

In the absence of one of the aforementioned catalyst inhibitors the compositions will cure at ambient temperature over a period of several hours or days, or within in several minutes when heated at temperatures of up to 250 degrees C. Compositions containing one of these catalyst inhibitors are typically cured by heating them for several minutes at temperatures of from 50 to about 250 degrees C. A preferred range is from 100 to 200 degrees C.

Cured elastomeric articles prepared using the curable compositions of this invention exhibit tear strengths above about 200 pounds per inch (35 kN/m) and tensile strengths above about 1500 p.s.i. (10.3 MPa) without adversely affecting other desirable properties of the cured elastomer or the extrudability of the composition from which it is formed. This unique combination of properties make the elastomers desirable for a number of end use applications, including gaskets and fabricated articles wherein at least a portion of the article is relatively thin and subjected to large amounts of stress. Articles of this type include diaphragms and bladders.

The following example describes preferred curable compositions of this invention and the properties of elastomers prepared by curing these compositions. The example is intended to illustrate the present invention and should not be interpreted as limiting the invention as defined in the accompanying claims. Unless indicated to the contrary all parts and percentages are by weight and all viscosities were measured at 25 degrees C.

EXAMPLE

Curable organosiloxane compositions were prepared by blending to homogeneity in a dough type mixer
 35.0 parts of a fume silica having a nominal surface area of 250 m² per gram,
 20.0 parts of quartz having an average particle size of five microns,
as the silica treating agents (1) 7.0 parts of hexamethyldisilazane. (2) 1.0 part of a hydroxyl-terminated polydimethylsiloxane fluid having a viscosity of about 0.04 Pa.s at 25 degrees C. and containing about 4 weight percent of silicon-bonded hydroxyl groups. (3) 1.5 parts of water and either (a) 0.27 part of sym-tetramethyldivinyldisilazane (X) or (b) 0.43 part of sym-tetramethyldi(5-hexenyl)disilazane (Y). and 45.5 parts of a dimethylalkenylsiloxy-terminated polydimethylsiloxane (polymer 1) having a viscosity of about 50 Pa.s at 25 degrees C. where the alkenyl group was 5-hexenyl (ingredient A) or vinyl (ingredient A').

The resultant mixture was heated for one hour by circulating steam through the jacket of the mixer while volatile materials were removed under reduced pressure. Following completion of the heating cycle 47.5 parts of polydiorganosiloxane A or A' were added (to match the type of polymer already added) together with 7.0 parts (as polydiorganosiloxane 2) of a dimethylalkenyl-terminated dimethylsiloxane/methylalkenylsiloxane copolymer (polymer 2) containing 2 mole percent of methylalkenylsiloxane units, where the alkenyl radical was either 5-hexenyl (B) or vinyl (B').

The resultant compositions were then blended to homogeneity under ambient conditions and then combined with 2.19 parts of a trimethylsiloxy terminated polyorganosiloxane having an average of five methylhydrogensiloxane units and three dimethylsiloxane units per molecule and containing from 0.7 to 0.8 weight percent of silicon-bonded hydrogen atoms as the curing agent, and as the curing catalyst a reaction product of hexachloroplatinic acid and sym-tetramethyldivinyldisilazane that had been diluted with a liquid trimethylsiloxy-terminated polydimethylsiloxane in an amount sufficient to achieve a platinum content of 0.7 weight percent based on the weight of the curable composition.

The amount of curing agent was equivalent to a molar ratio of silicon bonded hydrogen atoms to alkenyl radicals in the total curable composition of 2.0.

As each of the compositions was prepared its cure time was determined using an oscillating rheometer maintained at a temperature of 25 degrees C. The elapsed times, in minutes, required for the composition to exhibit 50 percent ($T_{50}$) and 90 percent ($T_{90}$) of the maximum torque value exhibited by the cured elastomer were recorded and appear in the accompanying table.

Test samples for determination of physical properties were prepared in the form of cured sheets having a thickness of 1.9 mm. by confining the composition within a suitable chase on the bed of a hydraulic press and heating the composition for 5 minutes at a temperature of 150 degrees C. Test samples were then cut from each of the sheets to determine the physical properties of the cured materials using the appropriate test methods defined by the American Society for Testing of Materials (ASTM).

Samples prepared for comparative purposes are identified in the following table by the letter C following the number of the sample.

| | Sample No. | | | | | | |
|---|---|---|---|---|---|---|---|
| Ingredient | 1C | 2 | 3 | 4C | 5 | 6 | 7C |
| Polymer 1 | A' | A | A' | A | A | A' | A' |
| Polymer 2 | B' | B | B | B' | B | B | B' |
| Filler Treating Agent | X | Y | Y | Y | X | X | Y |
| $T_{50}$ (min.) | 33.3 | 5.6 | 8.9 | 42.6 | 3.8 | 6.1 | 42.7 |
| $T_{90}$ (min.) | 46.7 | 31.0 | 23.2 | 59.0 | 16.8 | 18.8 | 48.8 |
| Properties | | | | | | | |
| Durometer Hardness (Shore A Scale) | 39 | 38 | 43 | 38 | 37 | 39 | 42 |
| Tensile Strength (MPa) | 7.2 | 5.7 | 6.8 | 5.8 | 5.3 | 7.6 | 7.7 |
| Tear (Die B, kN/m) | 46 | 32 | 48 | 36 | 35 | 45 | 42 |

The data in the foregoing table demonstrate the substantial decrease in cure time ($T_{90}$) from 46.7 to 18.8 minutes achieved when the alkenyl radical on polymer 2 is 5-hexenyl and all the remaining alkenyl radicals are vinyl (sample 6). The curing time ($T_{90}$) actually increases (from 46.7 to 59.0 minutes) when the alkenyl radicals present in polymer 1 and the silica treating agent are 5-hexenyl and the alkenyl radicals in polymer 2 are vinyl (sample 4C). The presence of 5-hexenyl radicals on the silica treating agent (sample 7C) also results in a cure time ($T_{90}$) that is longer (48.8 minutes) than the cure time for sample 1C wherein all of the alkenyl radicals are vinyl. The shortest curing time (16.8 minutes) is achieved when the alkenyl radicals in polydiorganosiloxanes A and B are 5-hexenyl and the alkenyl radicals in the silica treating agent are vinyl (Sample 5).

The American Society of Testing Procedures (ASTM) methods used to measure the various properties evaluated included ASTM-412 for tensile strength.

ASTM-D625, Die B for tear strength and ASTM-D2240, Shore A scale for durometer hardness values.

That which is claimed is:

1. In an improved curable organosiloxane composition comprising the product obtained by mixing to homogeneity
   A. from 70 to 95 weight percent, based on the total weight of (A) and (B). of a first liquid diorganoalkenylsiloxy terminated polydiorganosiloxane exhibiting a viscosity of at least 12 Pa.s at 25 degrees C. and containing substantially no ethylenically unsaturated hydrocarbon radicals bonded to non-terminal silicon atoms.
   B. from 5 to 30 weight percent, based on the total weight of (A) and (B), of a second liquid diorganoalkenylsiloxy-terminated polydiorganosiloxane which is miscible with said first polydiorganosiloxane and exhibits a viscosity of at least 0.1 Pa.s at 25 degrees C., where from 1 to 5 mol percent of the non-terminal repeating units of said second polydiorganosiloxane contain an alkenyl radical,
   C. an amount sufficient to cure said composition of an organohydrogensiloxane that is miscible with the other liquid ingredients of said composition and contains an average of more than two silicon bonded hydrogen atoms per molecule,
   D. a platinum-containing hydrosilation catalyst in an amount sufficient to promote curing of said composition at a temperature of from ambient to 250 degrees C., and
   E. an amount of a treated reinforcing silica filler sufficient to improve the physical properties of a cured elastomer prepared from said composition, where the filler treating agent is comprised at least in part of an organosilicon compound containing an average of at least one alkenyl radical per molecule,
the improvement comprising the presence, as the alkenyl radical in said second liquid diorganoalkenylsiloxy-terminated polydiorganosiloxane (B), of a radical which is terminally unsaturated and contains at least four carbon atoms.

2. A composition according to claim 1 where said first diorganoalkenylsiloxy terminated polydiorganosiloxane (A) is represented by the average general formula $$R^1R^2_2SiO(R^2_2SiO)_xSiR^2_2R^1$$

where $R^1$ represents a terminally unsaturated alkenyl radical, containing at least two carbon atoms, the two $R^2$ radicals bonded to each silicon atom are individually selected from monovalent hydrocarbon radicals or substituted monovalent hydrocarbon radicals and are substantially free of ethylenic unsaturation, and x represents a degree of polymerization equivalent to a viscosity of at least 12 Pa.s at 25° C.; said second diorganoalkenylsiloxy terminated polydiorganosiloxane is represented by the average general formula $$R^3R^4_2SiO(R^4_2SiO)_y(R^3R^4SiO)_zSiR^4_2R^3$$

where $R^3$ represents a terminally unsaturated alkenyl radical containing at least four carbon atoms, $R^4$ is selected from the same group of monovalent hydrocarbon radicals and substituted monovalent substituted hydrocarbon radicals as $R^2$, the sum of y and z represent a degree of polymerization equivalent to a viscosity of at least 0.1 Pa.s at 25° C. and the ratio $z/(y+z)$ is from 0.01 to 0.05; said first diorganoalkenylsiloxy-terminated polydiorganosiloxane contains alkenyl radicals on no more than 0.2 percent of the non-terminal silicon atoms.

3. A composition according to claim 2 where the alkenyl radicals on said first polydiorganosiloxane are vinyl or 5-hexenyl, $R^3$ contains at least six carbon atoms, at least 50 percent of the radicals represented by $R^2$ and $R^4$ are methyl and any remaining radicals are selected from the group consisting of phenyl and 3,3,3-trifluoropropyl; said second polydiorganosiloxane constitutes from 5 to 30 percent of the combined weight of said first and second polydiorganosiloxanes; and the molar ratio of silicon-bonded hydrogen atoms to alkenyl radicals in said composition is from 1 to 2.

4. A composition according to claim 3 where $R^2$ and $R^4$ are methyl, $R^3$ is 5-hexenyl the viscosity of said first polydiorganosiloxane is from 40 to 70 Pa.s at 25 degrees C., the viscosity of said second polydiorganosiloxane is from 0.1 to 10 Pa.s at 25 degrees C., said organohydrogensiloxane (C) is a trimethylsiloxy terminated dimethylsiloxane/methylhydrogensiloxane copolymer; the alkenyl radicals on said filler treating agent are vinyl and said composition contains an inhibitor for said hydrosilation catalyst.

5. A composition according to claim 1 where said composition is packaged in at least two containers, the organohydrogensiloxane and the hydrosilation catalyst being located in different containers.

6. A composition according to claim 5 where the volumes of material in each container are substantially equal and the material in each container comprises said first and second polydiorganosiloxane and said treated silica filler.

7. A composition according to claim 1 where the viscosity of said composition is less than 20 Pa.s at 25 degrees C.

* * * * *